(No Model.)
I. WILLIAMS.
DRESS CHART.
No. 602,117.          Patented Apr. 12, 1898.
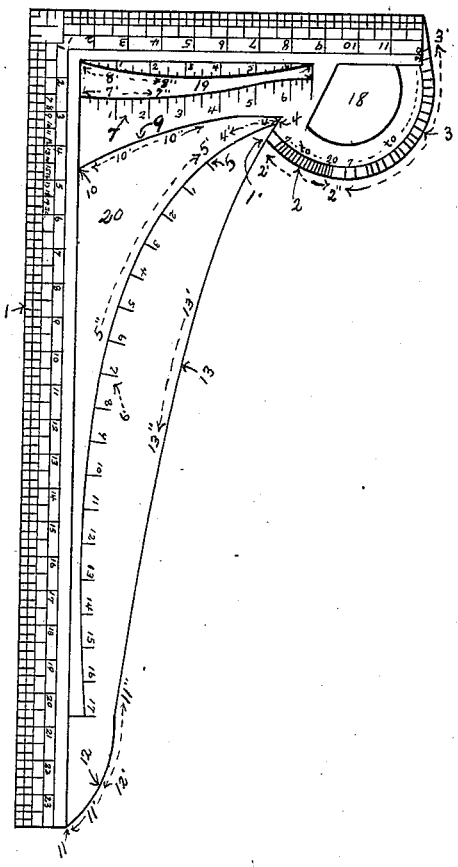
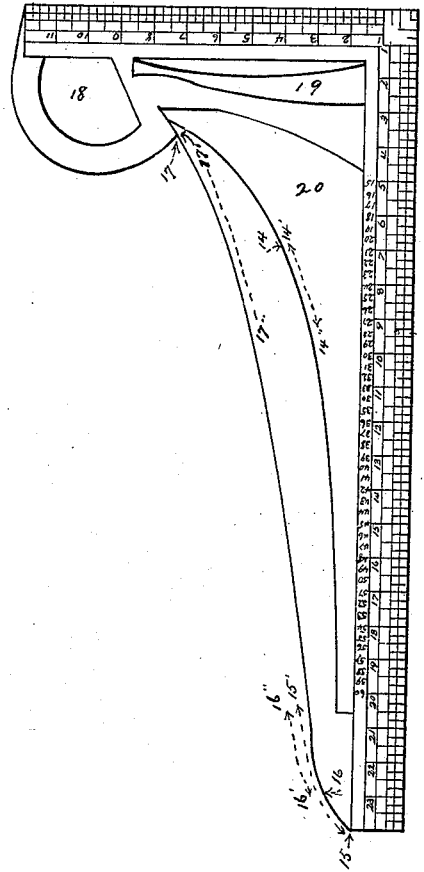
Witnesses          Inventor
D. R. Amidon          Ida Williams
N. Fitzpatrick          By N. B. Hagin, Atty.

UNITED STATES PATENT OFFICE.

IDA WILLIAMS, OF WICHITA, KANSAS.

DRESS-CHART.

SPECIFICATION forming part of Letters Patent No. 602,117, dated April 12, 1898.

Application filed June 1, 1897. Serial No. 639,048. (No model.)

*To all whom it may concern:*

Be it known that I, IDA WILLIAMS, a citizen of the United States of America, residing at Wichita, in the county of Sedgwick and State of Kansas, have invented certain new and useful Improvements in Dress-Charts, of which the following is a specification, reference being had therein to the accompanying drawings, and the figures of reference thereon, forming a part of this specification, in which—

Figure 1 is a side view of one side of my improved dress-chart. Fig. 2 is a like view of the opposite side of the same.

This invention relates to certain improvements in dress-charts for measuring and drafting garments by what is known as the "Taylor" system; and it consists of the curves and arrangement of curves and measurements; and the object of my invention is to produce a chart by which any garment can be measured and drafted for cutting in a systematic manner and in perfect proportion.

Referring to the drawings, 1 represents a square.

1' represents the starting-point for drafting the front and back part of the neck of a garment.

2 represents a back-neck scale and curve from 2' to 2", said scale having figures from "7" to "20," as shown.

3 represents a front-neck scale and curve from 2' to 3'. Said scale is provided with figures from "7" to "20," the divisions being unequal in length, as shown.

4 represents the starting-point for the armscye, top of sleeve, &c.

5 represents the starting-point for the curve of the side form, 5' and 5" representing said curve. Said curve is also provided with the scale 6.

7' and 7" represent the shoulder-curve, said curve being provided with the scale 7 for ascertaining the length of shoulder.

8' and 8" represent the front shoulder-curve. Said curve is also provided with a scale, as shown.

9 represents the starting-point for the center of back arm-scye.

10 represents the starting-point for the arm-scye in the side form.

10' and 10" represent the curve for the back arm-scye and the top of the under-arm gore or arm-scye in the under-arm gore.

11 represents the starting-point for the hip-curve.

11' and 11" represent the hip-curve for drawing lines from the waist-line down.

12 represents the starting-point for the top of dart.

12' and 11" represent the curve used in drawing the dart above the waist and skirts over the hips.

13 represents the sleeve-curve.

13' and 13" represent the curve for the inside of the sleeve and from the elbow to the wrist of the outside of the same; also the top of skirt, &c.

14 represents the starting-point for collars, (see Fig. 2,) and 14' and 14" is the curve-line of the same.

15 represents the starting-point for the hip-curve 15' and 15". Said curve is also used in shaping the lower part of the waist and skirts over the hips.

16 represents the front of the curve 16' and 16", which is used in finishing the dart above the waist.

17 represents the starting-point for the sleeve-curve 17' and 17".

17' to 17" is the curve used for drawing the inside sleeve.

18, 19, and 20 represent cut-away portions in said chart.

Having thus described my invention, what I claim as new and useful, and desire to secure by Letters Patent, is as follows:

1. The herein-described dress-chart consisting of the combination of a square, a back and front neck curve, a back-neck scale, a front-neck scale the divisions being unequal in length on said neck-curve, a convex and concave brace leading from said neck-curve to the end of the long arm of said square, said convex curve having a back-curve scale, the inner end of the short arm of said square being convex forming the front-shoulder curve, and having a front-shoulder scale, a double concave arm connecting the neck-curve to the long arm of said square, the upper concave curve of said arm having a back-shoulder scale, and the lower concave curve for the back arm-scye.

2. The herein-described dress-chart, consisting of the combination of a square having arms of unequal length, the inner edge of the shorter of said arms being convex, and provided with a front-shoulder scale, a back and front neck curve, a back-neck scale, and a front-neck scale with the divisions unequal in length on said neck-curve, a concave and convex arm joining said neck-curve to the long arm of said square, said convex side having a back-curve scale, said concave side terminating at said neck-curve on an angle, a double concave arm nearly parallel to the short arm of said square, one of the concave curves having a back-shoulder scale.

IDA WILLIAMS.

Witnesses:
S. B. AMIDON,
N. FITZPATRICK.